(12) United States Patent
Knobloch et al.

(10) Patent No.: US 11,493,593 B2
(45) Date of Patent: Nov. 8, 2022

(54) METHOD AND ARRANGEMENT FOR DETERMINING AN OCCUPIED REGION OF A RADIO DEVICE, AND VEHICLE HAVING SUCH AN ARRANGEMENT

(71) Applicant: Bayerische Motoren Werke Aktiengesellschaft, Munich (DE)

(72) Inventors: Daniel Knobloch, Munich (DE); Alexander Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 99 days.

(21) Appl. No.: 17/056,725

(22) PCT Filed: Apr. 17, 2019

(86) PCT No.: PCT/EP2019/059973
§ 371 (c)(1),
(2) Date: Nov. 18, 2020

(87) PCT Pub. No.: WO2019/238302
PCT Pub. Date: Dec. 19, 2019

(65) Prior Publication Data
US 2021/0199750 A1   Jul. 1, 2021

(30) Foreign Application Priority Data

Jun. 11, 2018 (DE) .................. 10 2018 209 258.3

(51) Int. Cl.
*G01S 5/14* (2006.01)
*G01S 5/02* (2010.01)
*G06N 20/00* (2019.01)

(52) U.S. Cl.
CPC ............. *G01S 5/14* (2013.01); *G01S 5/0268* (2013.01); *G06N 20/00* (2019.01)

(58) Field of Classification Search
CPC ................................. G01S 5/14; G01S 5/0268
See application file for complete search history.

(56) References Cited

U.S. PATENT DOCUMENTS

| | | | | |
|---|---|---|---|---|
| 6,865,395 | B2 * | 3/2005 | Riley | H04W 64/00 342/464 |
| 7,474,264 | B2 * | 1/2009 | Bolduc | G01S 5/02 342/463 |

(Continued)

FOREIGN PATENT DOCUMENTS

| | | |
|---|---|---|
| DE | 10 2015 208 621 A | 11/2016 |
| DE | 10 2015 209 755 A1 | 12/2016 |

(Continued)

OTHER PUBLICATIONS

International Search Report (PCT/ISA/210) issued in PCT Application No. PCT/EP2019/059973 dated Sep. 24, 2019 with English translation (seven (7) pages).

(Continued)

*Primary Examiner* — Cassi J Galt
(74) *Attorney, Agent, or Firm* — Crowell & Moring LLP (57) ABSTRACT

A method for determining an occupied region of a first radio device is provided. According to the method, a signal is transmitted from the first radio device and received by at least two additional radio devices. Based on a propagation time of the signal from the first radio device to the additional radio devices, a surrounding region is determined around each of the additional radio devices in which the first radio device is located. The occupied region of the first radio device is determined based on an overlapping region which results from an overlapping of all surrounding regions. Alternatively, signals can also be transmitted from the additional radio devices and received by the first radio device. The method can be used to determine whether an (Continued)

automobile key having a radio transmitter is located in a vehicle.

16 Claims, 4 Drawing Sheets

(56) References Cited

U.S. PATENT DOCUMENTS

| | | | |
|---|---|---|---|
| 9,188,661 B2* | 11/2015 | Wirola | G01S 5/12 |
| 9,612,322 B2* | 4/2017 | Harda | G01S 13/56 |
| 2003/0050077 A1* | 3/2003 | Takeuchi | G01S 5/12 |
| | | | 455/456.1 |
| 2007/0162191 A1 | 7/2007 | Matsubara et al. | |
| 2009/0066473 A1* | 3/2009 | Simons | H04L 12/2803 |
| | | | 340/3.1 |
| 2014/0274018 A1 | 9/2014 | Miller | |
| 2017/0188326 A1 | 6/2017 | Jeon | |
| 2018/0053416 A1 | 2/2018 | Sanji et al. | |
| 2020/0269809 A1 | 8/2020 | Sanji et al. | |
| 2021/0033694 A1* | 2/2021 | Olsson | G01S 5/14 |

FOREIGN PATENT DOCUMENTS

| | | |
|---|---|---|
| DE | 10 2016 217 532 A1 | 3/2018 |
| JP | 2017-118485 A | 6/2017 |
| WO | WO 97/27711 A1 | 7/1997 |
| WO | WO 2014/047352 A2 | 3/2014 |
| WO | WO 2018/036761 A1 | 3/2018 |

OTHER PUBLICATIONS

German-language Written Opinion (PCT/ISA/237) issued in PCT Application No. PCT/EP2019/059973 dated Sep. 24, 2019 (eight (8) pages).

German-language Search Report issued in German Application No. 10 2018 209 258.3 dated Feb. 28, 2019 with partial English translation (14 pages).

* cited by examiner

METHOD AND ARRANGEMENT FOR DETERMINING AN OCCUPIED REGION OF A RADIO DEVICE, AND VEHICLE HAVING SUCH AN ARRANGEMENT

BACKGROUND AND SUMMARY OF THE INVENTION

The present invention relates to a method and an arrangement for determining an area occupied by a radio apparatus and to a vehicle having such an arrangement, in particular a motor vehicle.

A number of methods and systems for determining the position of radio transmitters are already known from the prior art. These are usually based on noisy distance estimations between the radio transmitter at an unknown position and a plurality of radio transmitters with known positions (also called "anchors" in the present application) by means of a propagation time measurement, field strength measurement and incidence angle measurement of signals between the radio transmitter at the unknown position (also simply called "radio transmitter" in the present application) and the anchors or a combination of these. In order to determine whether the radio transmitter is situated in a defined occupied area, the position of the radio transmitter can be estimated from measurement data, which are determined by means of the above-mentioned techniques, by means of analytical methods (for example trilateration or multilateration in the case of three or more anchors, Kalman filtering in the case of moving radio transmitters) or stochastic methods for determining the occupation probability distribution (practical implementation, for example by means of particle filters). Alternatively, a direct classification into occupied areas can be carried out on the basis of the measured values (for example machine learning with a classifier model and training data). DE 10 2015 208621 A1, WO2018/036761 A1 and DE 10 2015 209755 A1 can be mentioned, for example, as the prior art.

The inventors of the present invention have recognized that the accuracy or reliability of all of the above-mentioned methods and the resulting zone classification is dependent on the noise power of the measured values provided by the anchors. A reliable, definitive decision regarding the whereabouts of the radio transmitter cannot be made in any of the above-mentioned methods. Furthermore, the above-mentioned methods require a minimum number of three anchors to calculate the radio transmitter position.

Against this background, the object of the present invention is to provide an alternative, in particular improved, method and an alternative, in particular improved, arrangement for determining an area occupied by a radio apparatus. A further object of the present invention is to provide a vehicle having such an arrangement.

Features and advantages of the present invention are explained below predominantly on the basis of a particular application. In this application, it is determined whether a radio transmitter which undertakes the function of a conventional automobile key is situated in a vehicle interior. The inventors have recognized that it is important, in particular in such an application, from security-related considerations, that it can be determined with virtually 100% certainty whether or not the radio transmitter is situated in the vehicle interior. In its broadest form, however, the invention is not restricted to such an application.

One or more of the above-mentioned objects are achieved, according to the invention, by means of a method, an arrangement and a vehicle according to the respective independent patent claims. The dependent patent claims, the description and the Figures relate to advantageous embodiments of the invention.

A first aspect of the invention relates to a method for determining an area occupied by a first radio apparatus, wherein the method comprises:

emitting a signal from the first radio apparatus, receiving the signal by means of at least two further radio apparatuses, determining, on the basis of a propagation time of the signal from the first radio apparatus to the further radio apparatuses, a surrounding area around each of the further radio apparatuses in which the first radio apparatus is situated, and determining the area occupied by the first radio apparatus on the basis of an overlapping area which results from a superimposition of all surrounding areas.

By virtue of such a method which, on the basis of a propagation time, in particular on the basis only of a propagation time of the signal, determines a respective surrounding area around the further radio apparatuses in which the first radio apparatus is situated, the method can determine the area occupied by the first radio apparatus with greater certainty than in the prior art. The invention is based, inter alia, on the knowledge that the shortest signal propagation time between the first radio apparatus and a further radio apparatus (anchor) is limited, on one side, by the physical constant of the speed of light. Conversely, a physically verifiable, maximum distance between the respective anchor and the first radio apparatus results from each measurement of the propagation time with respect to an anchor. The (geometrical) superimposition of two or more of these surrounding areas produces an overlapping area, the outer sides of which form a convex geometrical body. According to the invention, it can then be concluded that the first radio apparatus is situated inside this convex body. The convex body can therefore be considered to be the area occupied by the first radio apparatus, or an area occupied by the first radio apparatus can be determined therefrom, as described below in connection with some embodiments.

A second aspect of the invention relates to a method for determining an area occupied by a first radio apparatus, wherein the method comprises:

emitting a respective signal from at least two further radio apparatuses, receiving the signals by means of the first radio apparatus, determining, on the basis of a propagation time of the signals from the further radio apparatuses to the first radio apparatus, a surrounding area around each of the further radio apparatuses in which the first radio apparatus is situated, and determining the area occupied by the first radio apparatus on the basis of an overlapping area which results from a superimposition of all surrounding areas.

This second aspect is very similar to the first aspect, but signals are emitted from the at least two further radio apparatuses (anchors) and are received by means of the first radio apparatus in the second aspect. The surrounding areas around the further radio apparatuses and the area occupied by the first radio apparatus can be determined, in principle, in a similar manner to the first aspect.

According to one preferred embodiment, when determining each surrounding area, it is substantially completely ensured that the first radio apparatus is actually situated in the respective surrounding area, wherein the determination of the surrounding areas preferably corresponds to that which is standardized in the task group IEEE 802.15.4z.

These and further embodiments are used both in connection with the first aspect and in connection with the second aspect of the invention.

According to this embodiment, use is therefore made of method steps, after the performance of which it is possible to be (virtually) absolutely certain that the first radio apparatus is situated within each surrounding area. The overlapping area and therefore the area occupied by the first radio apparatus can be determined therefrom with corresponding certainty.

For example, corresponding certainty can be achieved by using radio apparatuses which (or the method of operation of which) correspond to that which is standardized in the task group IEEE 802.15.4z.

The terms "substantially completely ensured," "(virtually) absolute certainty" etc. are preferably used to mean that the surrounding areas are normally always correctly determined, with only extremely few exceptions. In particular, such exceptions could be attributable merely to malfunctions which, however, can be minimized within the scope of the technical possibilities. In any case, the reliability with which the surrounding areas are determined does not depend, in particular, on the signal power or the noise power and it should therefore be expected that a greater degree of reliability than according to already known approaches can be achieved.

However, with an increasing noise power, in particular in relation to the signal power, the surrounding areas become larger according to embodiments of the invention, which generally means that the overlapping area or the area occupied by the first radio apparatus, as determined according to the invention, also becomes larger. However, the reliability of the method is not adversely affected thereby, that is to say it can still be assumed with (virtually) absolute certainty after carrying out the method according to the invention that the first radio apparatus is actually situated in the occupied area determined according to the invention. This is only larger in the case of noisy signals than in the case of low-noise signals.

According to one preferred embodiment, the determination of the area occupied by the first radio apparatus on the basis of the overlapping area comprises determining an outer sphere, in particular a minimum outer sphere of the overlapping area, wherein this outer sphere, in particular, is used as the area occupied by the first radio apparatus.

Determining an outer sphere on the basis of the overlapping area (which, as described above, normally assumes the shape of a convex body) makes it possible to simplify a subsequent comparison with a defined area. In particular, the determination of an outer sphere is relatively simple in mathematical terms and can therefore be quickly carried out. Alternatively, other geometrical bodies, for example a cuboid, a cube, an octahedron or the like, could be determined on the basis of the overlapping area, wherein the geometrical body determined in this manner represents the area occupied by the first radio apparatus.

A minimum outer sphere is preferably determined because the area occupied by the first radio apparatus, as determined according to the invention, is therefore also reduced to a smaller volume, which is advantageous for a subsequently described comparison with a defined area.

As an alternative to determining an outer sphere, the determination of the area occupied by the first radio apparatus on the basis of the overlapping area can comprise a rasterization of the overlapping area, wherein all areas which result from the rasterization are used, in particular, as the area occupied by the first radio apparatus.

Such a rasterization is generally more complicated in mathematical terms than the determination of an outer sphere. However, the volume of a body determined by means of rasterization is normally smaller than the volume of a minimum outer sphere (in particular if a sufficiently small raster spacing is selected).

According to one preferred embodiment, it is determined whether the area occupied by the first radio apparatus is completely in a defined area, in particular in a predefined area.

According to this embodiment, it can therefore be determined with (virtually) absolute certainty whether the first radio apparatus is situated in the defined area. If the method according to the invention therefore reveals that the area occupied by the first radio apparatus, as determined according to the invention, is completely in the defined area, it can be assumed that the first radio apparatus is actually situated in the defined area. Positive proof is therefore possible.

In this case, it should be noted that conversely it is not necessarily possible to conclude that the first radio apparatus is actually situated outside the defined area if the occupied area determined according to the invention is not completely in the defined area. For example, a section of the above-mentioned outer sphere may be outside the defined area even though the first radio apparatus is situated in another section of the outer sphere which is in the defined area. However, this does not impair the reliability in the case of positive proof (if the method therefore reveals that the area occupied by the first radio apparatus is completely in the defined area).

According to one preferred embodiment, the further radio apparatuses are situated in or on a vehicle, in particular a motor vehicle, and in particular are fastened or installed in or on the vehicle.

According to this embodiment, the area occupied by the first radio apparatus with respect to the vehicle can be determined.

According to one preferred embodiment, the above-mentioned defined, in particular predefined, area is substantially within a volume of the vehicle, in particular the motor vehicle.

It can therefore be determined whether the first radio apparatus is situated inside the vehicle. This is useful, in particular, for the application mentioned at the outset in which the intention is to determine whether a particular radio transmitter ("automobile key") is situated inside the corresponding vehicle. If this is the case, the starting of the engine of the motor vehicle can be enabled, for example. If it is not positively determined that the automobile key is situated inside the vehicle, the starting of the engine can be prevented.

A third aspect of the invention relates to an arrangement for determining an area occupied by a first radio apparatus, wherein the arrangement has:

at least two further radio apparatuses for receiving a signal from the first radio apparatus, means for determining, on the basis of a propagation time of the signal from the first radio apparatus to the further radio apparatuses, a surrounding area around each of the further radio apparatuses in which the first radio apparatus is situated, and means for determining the area occupied by the first radio apparatus on the basis of an overlapping area which results from a superimposition of all surrounding areas.

The arrangement according to the third aspect corresponds substantially to the method according to the first aspect, to the advantages of which reference is made here.

A fourth aspect of the invention relates to an arrangement for determining an area occupied by a first radio apparatus, wherein the arrangement has:

at least two further radio apparatuses for emitting a respective signal, means for determining, on the basis of a propagation time of the signals from the further radio apparatuses to the first radio apparatus, a surrounding area around each of the further radio apparatuses in which the first radio apparatus is situated, and means for determining the area occupied by the first radio apparatus on the basis of an overlapping area which results from a superimposition of all surrounding areas.

The arrangement according to the fourth aspect corresponds substantially to the method according to the second aspect, to the advantages of which reference is made here.

A fifth aspect relates to a vehicle, in particular a motor vehicle, having one of the arrangements described above.

The advantageous configurations and embodiments presented with respect to the method and their advantages accordingly also apply to the arrangement according to the invention and to the vehicle according to the invention and vice versa.

Further features of embodiments of the invention emerge from the claims, the Figures and the description of the Figures. All of the features and combinations of features mentioned above in the description and the features and combinations of features mentioned in the description of the Figures below and/or shown in the Figures alone can be used not only in the respectively stated combination but also in other combinations or alone provided that these combinations can be carried out and, in particular, are technically useful.

The invention is now explained in more detail on the basis of some exemplary embodiments and with reference to the accompanying drawings, in which components having the same or a similar function are provided with the same reference signs.

DETAILED DESCRIPTION OF THE DRAWINGS

Figure 1:
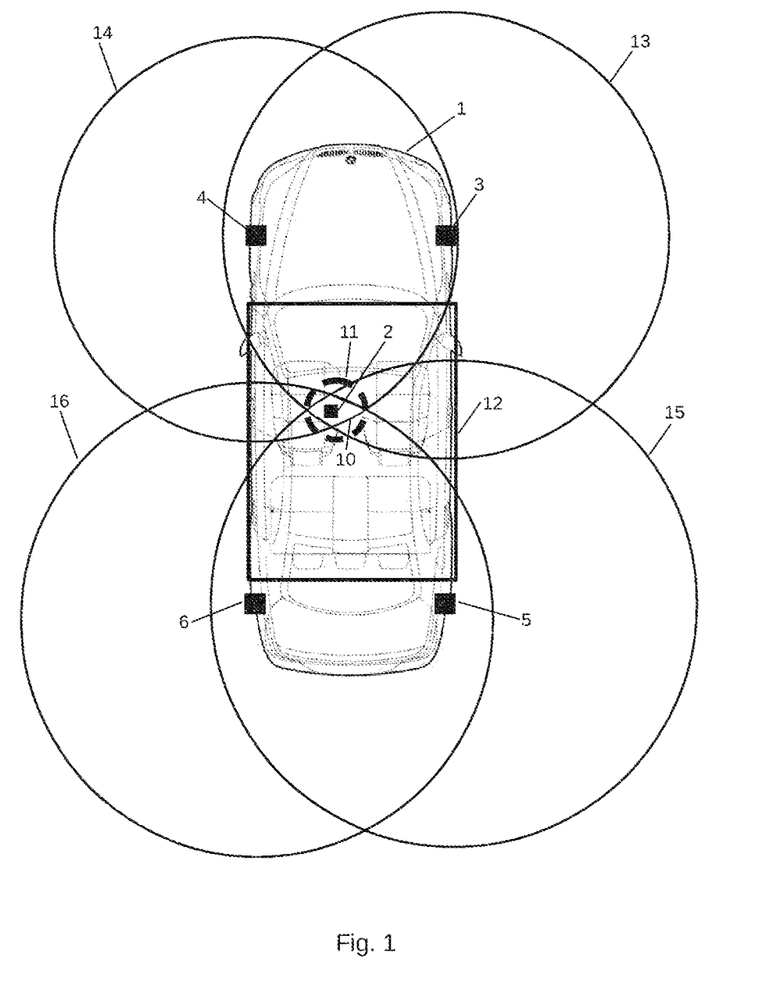
FIG. 1 schematically shows a first exemplary embodiment of an arrangement according to the invention from above, FIG. 2 schematically shows a second exemplary embodiment of an arrangement according to the invention from above, FIG. 3 schematically shows a third exemplary embodiment of an arrangement according to the invention from above, FIG. 4 schematically shows a flowchart having method steps of a method according to the invention, and FIG. 5 schematically shows vehicle electronics according to one embodiment.

The arrangement shown in FIG. 1 has four anchors ("further radio apparatuses") 3 to 6 which are fastened or installed in or on the vehicle 1 in this exemplary embodiment. The position of the four anchors 3 to 6 is only approximately represented by means of black squares in FIG. 1. It is advisable to distribute the anchors 3 to 6 with the greatest possible distance in the vicinity of the outer periphery of the vehicle 1. In the example shown, an anchor 3 is situated on the right in the vicinity of the front axle, an anchor 4 is situated on the left in the vicinity of the front axle, an anchor 5 is situated on the right in the vicinity of the rear axle and an anchor 6 is situated on the left in the vicinity of the rear axle. The anchors 3 to 6 may be installed in the vehicle body above the wheels, for example.

FIG. 1 also shows a defined area 12, here illustrated as a rectangle, wherein this defined area 12 is actually a three-dimensional body, for example a cuboid. This defined area is not visible as such. It is only "defined" and can be predefined by the vehicle manufacturer. For example, the defined area 12 may correspond substantially to the vehicle interior or a section of the vehicle interior. The definition of the area 12 can be stored, for example, in the vehicle electronics, in particular in an on-board computer.

FIG. 1 also shows a radio transmitter 2 ("first radio apparatus"). This may substantially undertake the function of an automobile key. The on-board electronics of the vehicle 1 can now be programmed in such a manner that the starting of the engine and/or other vehicle functions is enabled only if it is positively determined that the radio transmitter 2 is situated within the defined area 12. Otherwise (if such positive proof is therefore not available), the starting of the engine or other vehicle functions is not enabled.

Figure 4:
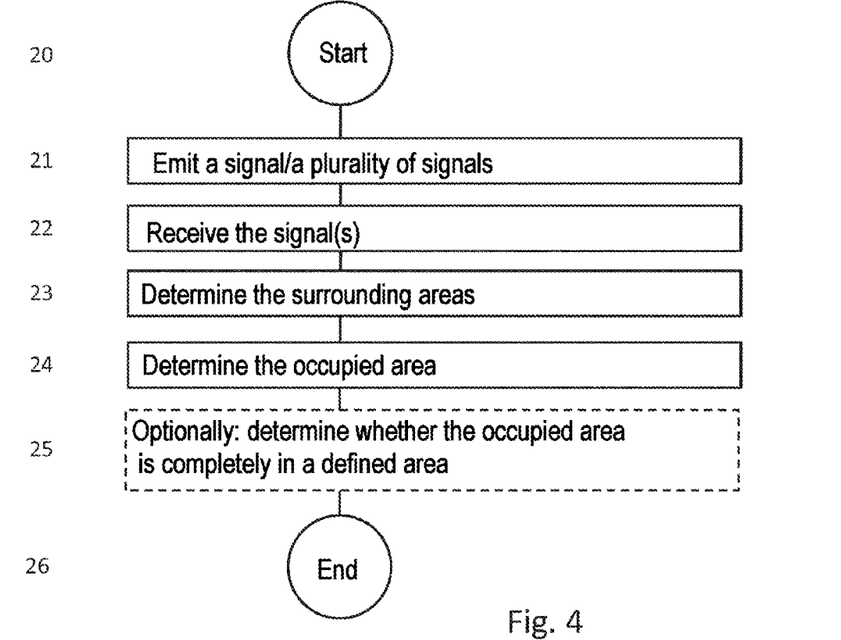
Figure 5:
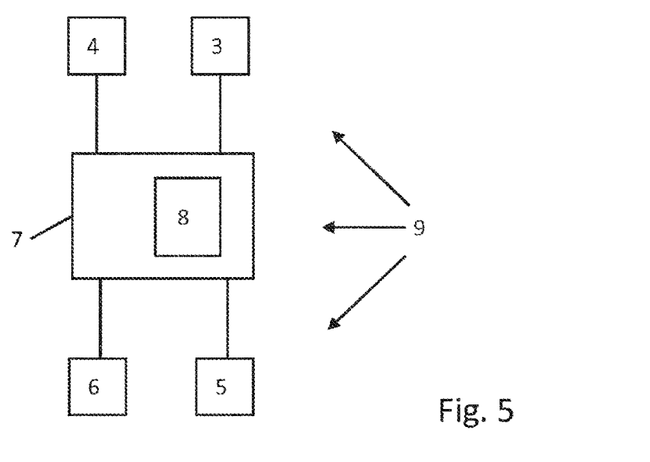

Reference is now also made to FIG. 4, which illustrates a flowchart of an exemplary embodiment of a method according to the invention, and to FIG. 5, which illustrates a part of the vehicle electronics of the vehicle 1 shown in FIG. 1. The vehicle electronics 9 shown in FIG. 5 have an on-board computer 7 with a processor 8. The anchors 3 to 6 are also part of the vehicle electronics 9. They are connected to the on-board computer 7.

After the method shown in FIG. 4 has been started 20, a signal is emitted by the radio transmitter 2 in a step 21. This signal can be coded in a suitable manner, with the result that the signal can be assigned to the radio transmitter 2 by means of the coding. After emission, the signal propagates at the speed of light and is received by the anchors 3 to 6 in a step 22. On account of the distance between the radio transmitter 2 and the individual anchors 3 to 6, the signal is not necessarily received at the same time in the corresponding anchors 3 to 6.

In particular, the propagation time of the signal from the radio transmitter 2 to the anchors 3 to 6 can be determined on the basis of suitable synchronization between the radio transmitter 2 and the anchors 3 to 6. This can be carried out, for example, by the processor 8 which is shown in FIG. 5 and receives corresponding signals/information from the anchors 3 to 6.

A surrounding area around each anchor is now respectively determined in a step 23 on the basis of the determined propagation times. This can also be carried out by the processor 8. The surrounding areas which are each assigned to the anchors 3 to 6 are represented by circles 13 to 16 in FIG. 1. These are actually spheres, at the center point of which the respective anchor can be found. In this embodiment, a method/protocol which determines the surrounding areas in such a manner that it is guaranteed with (virtually) absolute certainty that the radio transmitter 2 is actually situated in the corresponding surrounding area 13 to 16 is used to determine the surrounding areas. Such a method/protocol can be provided, for example, in accordance with that which is standardized in the task group IEEE 802.15.4z.

The received signal will generally be noisy. On account of this noise, the exact position of the radio transmitter 2 with respect to the anchors 3 to 6 cannot be exactly determined. Whereas, according to approaches in the prior art, a position is estimated as the position occupied by the radio transmitter 2 with respect to other radio apparatuses and a position determined in this manner can be expressed only with a certain probability (p<1), the noise of a received signal according to this exemplary embodiment has the effect that the processor 8 determines the surrounding areas to be sufficiently large, with the result that it is ensured with substantially 100% probability that the radio transmitter 2 is actually situated in the respective surrounding areas 13 to 16. In other words, the greater the noise, the larger the surrounding areas 13 to 16 become.

After the surrounding areas 13 to 16 have been determined, an area occupied by the radio transmitter 2 is determined in a step 24 which in turn can be carried out by the processor 8, for example. This is carried out on the basis of the consideration that the radio transmitter 2 must be situated in an overlapping area 10 of the surrounding areas 13 to 16. The overlapping area 10 (represented approximately as a rhombus in FIG. 1, but actually a three-dimensional body) could now be exactly determined and could be used as the occupied area, which would be too complicated for many applications in terms of the computing complexity, however, and also would not be necessary. Instead, according to this exemplary embodiment, an outer sphere 11 is determined, that is to say a sphere which completely surrounds the overlapping area 10. A minimum outer sphere, that is to say an outer sphere which is as small as possible, is preferably determined for this purpose.

The outer sphere 11 determined in this manner now represents the area occupied by the radio transmitter 2, that is to say it can be assumed with (virtually) absolute certainty according to the invention that the radio transmitter 2 is situated within the outer sphere 11.

After the occupied area 11 has been determined, the method could now be terminated (step 26).

Optionally, however, at least one further step 25 is also carried out, specifically a comparison of the occupied area or the outer sphere 11 of the radio transmitter 2 with a (previously) defined area 12. For this purpose, it is determined whether the outer sphere 11 is completely in the defined area 12. If this is the case, there is as it were positive proof that the radio transmitter 2 ("automobile key") is situated in the vehicle interior. If the outer sphere 11 is not completely within the defined area 12, there is no such positive proof and the starting of the engine of the vehicle 1 or other vehicle functions accordingly cannot be enabled, for example.

Different variants of the above exemplary embodiment are now indicated, in which case substantially only the differences to the above exemplary embodiment are discussed.

Variant 1: instead of determining an outer sphere 11 on the basis of the overlapping area 10, the overlapping area 10 is rasterized according to this variant, that is to say is divided into smaller, in particular regular, sections. The raster elements can assume the form of cubes or cuboids, for example, although other geometrical bodies are also possible in principle. All of the raster elements can then be considered to be the area occupied by the radio transmitter 2. In optional step 25, a comparison would then be carried out in order to determine whether the entire volume of all raster elements is within the defined area 12.

It should be expected that such rasterization is more complicated in mathematical terms than the determination of an outer sphere 11. The computing complexity can be influenced by selecting the raster spacing (the smaller the raster spacing, the more computing complexity).

Variant 2: this variant can be considered to be a combination of the exemplary embodiment described above with the first variant. According to variant 2, the outer sphere 11 can first of all be determined and it can be ascertained whether the outer sphere 11 is completely situated in the defined area 12. If this is the case, the positive proof is provided that the radio transmitter 2 is situated within the defined area 12. If it is determined that the outer sphere 11 is not completely within the defined area 12, the rasterization according to the first variant is carried out. Under certain circumstances, this may result in the positive proof nevertheless being able to be provided. This is not a contradiction. Finally, the outer sphere 11 is generally larger than the total volume of the raster elements, with the result that parts of the outer sphere 11 might be outside the defined area 12 even though the rasterized overlapping area is completely within the defined area 12. Such a case might be present, for example, if the radio transmitter 2 is close to the front or rear edge of the defined area 12. As is clear from FIG. 1, the front or rear part of the outer sphere 11 could then be outside the defined area 12, even though the rasterized area 10 would be completely within the defined area 12.

Variant 3: according to this variant, the radio transmitter 2 emits a plurality of signals, for example one signal for each anchor. The signals could differ by virtue of corresponding coding and could then be detected only by a corresponding anchor, for example.

Variant 4: parts of the method, for example the determination of the propagation time, the determination of the surrounding areas and/or the area occupied by the radio transmitter 2, could take place completely or partially in the anchors 3 to 6 instead of in a (central) on-board computer 7. In such a case, the anchors should accordingly communicate with/be connected to one another.

Variant 5: whereas a signal is emitted from the radio transmitter 2 in the exemplary embodiment described above, a signal is respectively emitted from the anchors and is received by the radio transmitter 2 according to this variant. The radio transmitter could itself determine the propagation time of the signals or could transmit, for example, the reception times of the signals back to the anchors 3 to 6 or to the on-board computer 7, with the result that the propagation times can be determined there and the further calculations can be carried out.

Variant 6: a first signal or a plurality of first signals could be emitted from one or more anchors 3 to 6, and a second signal would consequently be emitted from the radio transmitter 2 and would be received by the anchors 3 to 6. For this purpose, the radio transmitter 2 could be in the form of a transponder. The surrounding areas 13 to 16 could then be determined on the basis of half the propagation time of the (outgoing and return) signals.

Figure 2:
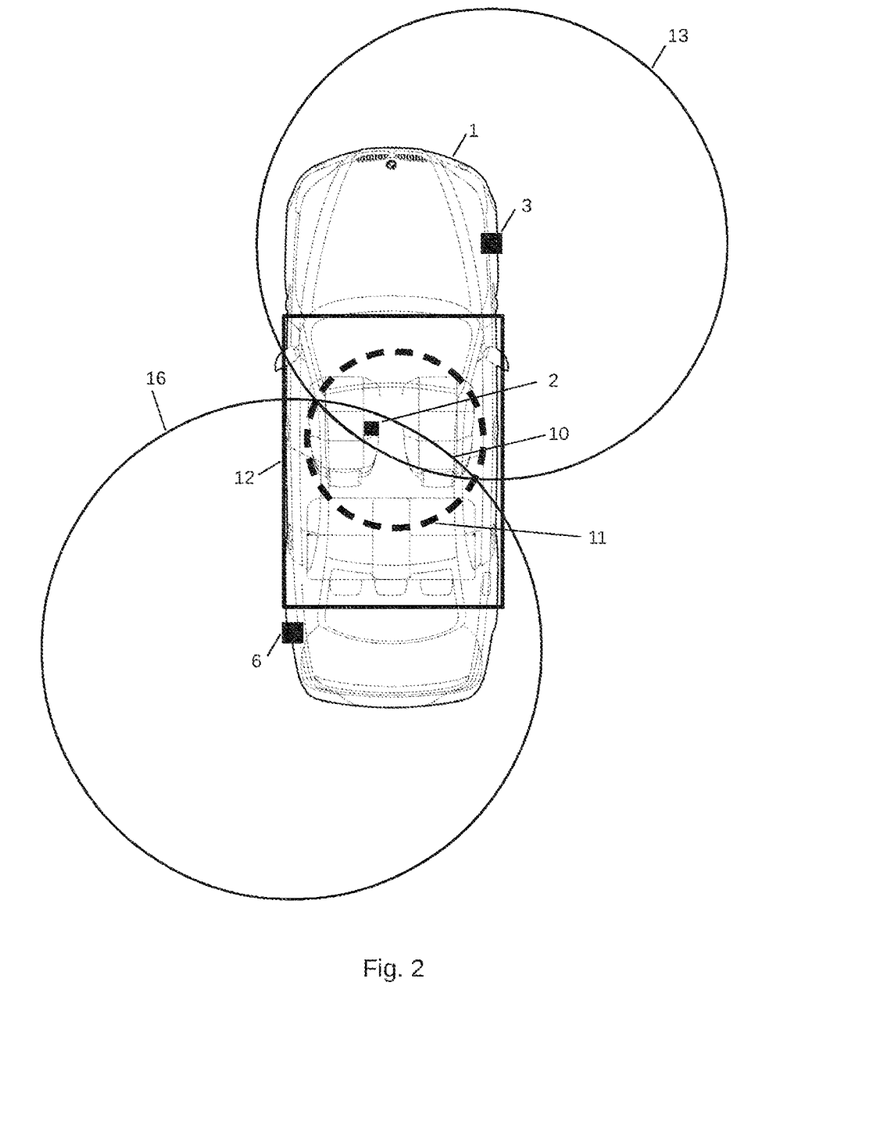

A second exemplary embodiment is shown in FIG. 2. In contrast to the first exemplary embodiment, only two anchors are present in the second exemplary embodiment, the anchor 3 at the front right and the anchor 6 at the rear left in this example. The emission/reception of the signal(s) and the subsequent determination of the surrounding areas around the anchors and the area occupied by the radio transmitter can be carried out as in the first exemplary embodiment or in the variants thereof. However, it should be expected that the overlapping area 10 is larger when using only two anchors than in the first exemplary embodiment. As shown in FIG. 2, the overlapping area 10 is a convex (three-dimensional) body 10, the shape of which could be referred to as a "double shell" or "UFO". The volume corresponds to the total volume of two flat shells which touch in a common circular area.

In accordance with the increased volume of the overlapping area 10 in the second exemplary embodiment in comparison with that in the first exemplary embodiment, the outer sphere 11 is also larger in the second exemplary embodiment. Nevertheless, the entire outer sphere 11 in the second exemplary embodiment is within the defined area 12, with the result that positive proof that the radio transmitter 2 is situated within the defined area 12 is also provided here.

Figure 3:
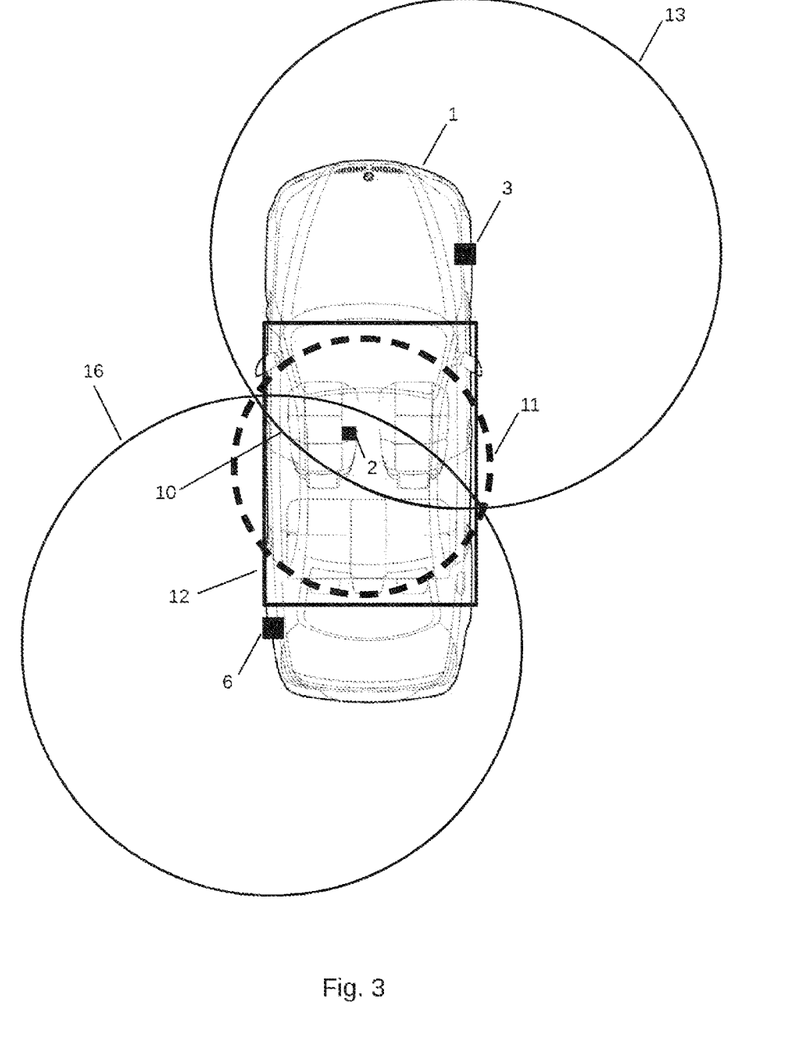

FIG. 3 finally shows a third exemplary embodiment, in which case the arrangement is, in principle, the same as in the second exemplary embodiment (FIG. 2). However, the surrounding areas 13 and 16 around the anchors 3 and 6 are larger in the third exemplary embodiment than the corresponding surrounding areas in the second exemplary embodiment on account of a greater noise power. Accordingly, the overlapping area 10 and also the outer sphere 11 are larger. As shown in FIG. 3, parts of the outer sphere 11 are situated outside the defined area 12, with the result that the method according to the invention cannot provide positive proof in this case that the radio transmitter 2 is situated within the defined area 12 (even though the radio transmitter 2 is actually situated within the defined area 12).

Whereas positive proof is therefore also possible when using only two anchors, like in the second and third exemplary embodiments, the use of three, four or more anchors is advantageous.

In all of the embodiments and variants presented above, it is possible to use radio apparatuses (radio transmitter 2, anchors 3 to 6), the range of which is a few meters, for example. However, the invention is not restricted in this respect, and the range of the radio apparatuses can be adapted according to the intended application.

In connection with the embodiments and variants described above, it may naturally be the case that the radio transmitter 2 is not situated within the defined area 12 or inside the vehicle 1 or is not even in the vicinity of the vehicle 1. In such a case, the failure to receive a corresponding signal would be assessed such that no surrounding area around one or more of the anchors can be determined and there is accordingly no overlapping area either.

Whereas at least one exemplary embodiment has been described above, it should be noted that a large number of variations exist. In this case, it should also be noted that the exemplary embodiments described are only non-limiting examples, and it is not intended to restrict the applicability of the configuration of the apparatuses and methods described here thereby. Rather, the above description will provide a person skilled in the art with an instruction for implementing at least one exemplary embodiment, in which case it goes without saying that different changes in the method of operation and the arrangement of the elements described in an exemplary embodiment can be carried out without departing from the subject matter respectively stipulated in the appended claims and its legal equivalents.

LIST OF REFERENCE SIGNS

1 Vehicle
2 Radio transmitter/first radio apparatus
3 to 6 Anchors/further radio apparatuses
7 On-board computer
8 Processor
9 Vehicle electronics
10 Overlapping area
11 Outer sphere
12 Defined area
13 to 16 Surrounding areas
20 to 26 Method steps

What is claimed is:

1. A method for determining an area occupied by a first radio apparatus, the method comprising:
emitting a signal from the first radio apparatus;
receiving the signal by at least two further radio apparatuses;
determining, based on a propagation time of the signal from the first radio apparatus to the further radio apparatuses, a surrounding area around each of the further radio apparatuses in which the first radio apparatus is situated; and
determining the area occupied by the first radio apparatus based on an overlapping area which results from a superimposition of all of the surrounding areas;
wherein determination of the area occupied by the first radio apparatus based on the overlapping area comprises a rasterization of the overlapping area, wherein all areas which result from the rasterization are used as the area occupied by the first radio apparatus.

2. The method according to claim 1, wherein, when determining the surrounding area around each of the further radio apparatuses, the first radio apparatus is actually situated in the surrounding area, wherein determination of the surrounding areas corresponds to that which is standardized in task group IEEE 802.15.4z.

3. The method according to claim 1, wherein determination of the area occupied by the first radio apparatus based on the overlapping area comprises determining a minimum outer sphere of the overlapping area, wherein the minimum outer sphere is used as the area occupied by the first radio apparatus.

4. The method according to claim 1, further comprising determining whether the area occupied by the first radio apparatus is completely in a predefined area.

5. The method according to claim 4, wherein the further radio apparatuses are fastened or installed in or on a motor vehicle.

6. The method according to claim 5, wherein the predefined area is within a volume of the motor vehicle.

7. A method for determining an area occupied by a first radio apparatus, the method comprising:
emitting a respective signal from at least two further radio apparatuses;
receiving the respective signals by the first radio apparatus;
determining, based on a propagation time of the respective signals from the further radio apparatuses to the first radio apparatus, a surrounding area around each of the further radio apparatuses in which the first radio apparatus is situated; and
determining the area occupied by the first radio apparatus based on an overlapping area which results from a superimposition of all of the surrounding area;
wherein determination of the area occupied by the first radio apparatus based on the overlapping area comprises a rasterization of the overlapping area, wherein all areas which result from the rasterization are used as the area occupied by the first radio apparatus.

8. The method according to claim 7, wherein, when determining the surrounding area around each of the further radio apparatuses, the first radio apparatus is actually situated in the surrounding area, wherein determination of the surrounding areas corresponds to that which is standardized in task group IEEE 802.15.4z.

9. The method according to claim 7, wherein determination of the area occupied by the first radio apparatus based on the overlapping area comprises determining a minimum outer sphere of the overlapping area, wherein the minimum outer sphere is used as the area occupied by the first radio apparatus.

10. The method according to claim 7, further comprising determining whether the area occupied by the first radio apparatus is completely in a predefined area.

11. The method according to claim 10, wherein the further radio apparatuses are fastened or installed in or on a motor vehicle.

12. The method according to claim 11, wherein the predefined area is within a volume of the motor vehicle.

13. An arrangement for determining an area occupied by a first radio apparatus, the arrangement comprising:
   at least two further radio apparatuses that receive a signal from the first radio apparatus; and
   a processor programmed to determine, based on a propagation time of the signal from the first radio apparatus to the further radio apparatuses, a surrounding area around each of the further radio apparatuses in which the first radio apparatus is situated, and determine the area occupied by the first radio apparatus based on an overlapping area which results from a superimposition of all surrounding areas;
   wherein determination of the area occupied by the first radio apparatus based on the overlapping area comprises a rasterization of the overlapping area, wherein all areas which result from the rasterization are used as the area occupied by the first radio apparatus.

14. An arrangement for determining an area occupied by a first radio apparatus, the arrangement comprising:
   at least two further radio apparatuses that emit a respective signal; and
   a processor programmed to determine based on a propagation time of the respective signals from the further radio apparatuses to the first radio apparatus, a surrounding area around each of the further radio apparatuses in which the first radio apparatus is situated, and determine the area occupied by the first radio apparatus based on an overlapping area which results from a superimposition of all surrounding areas;
   wherein determination of the area occupied by the first radio apparatus based on the overlapping area comprises a rasterization of the overlapping area, wherein all areas which result from the rasterization are used as the area occupied by the first radio apparatus.

15. A motor vehicle comprising the arrangement according to claim 13.

16. A motor vehicle comprising the arrangement according to claim 14.

* * * * *